No. 825,232. PATENTED JULY 3, 1906.
J. T. MITCHELL.
ARTIFICIAL BAIT.
APPLICATION FILED MAR. 21, 1903.
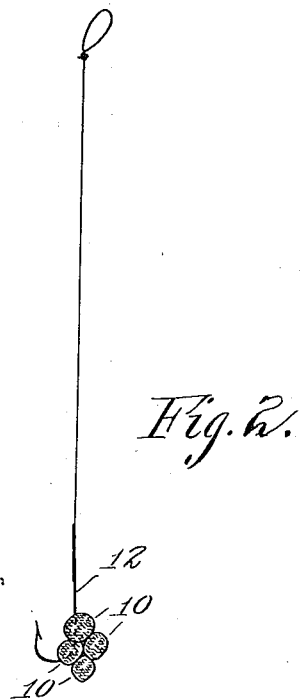
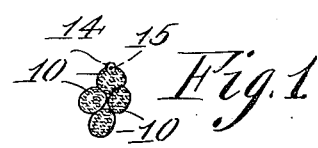
WITNESSES:
Alfred Breitung
Lilita Adams
INVENTOR.
John T. Mitchell
BY Frank E. Adams
ATTORNEY.

UNITED STATES PATENT OFFICE.

JOHN THOMAS MITCHELL, OF SEATTLE, WASHINGTON.

ARTIFICIAL BAIT.

No. 825,232.          Specification of Letters Patent.          Patented July 3, 1906.

Application filed March 21, 1903. Serial No. 148,993.

*To all whom it may concern:*

Be it known that I, JOHN THOMAS MITCHELL, a citizen of the United States of America, and a resident of the city of Seattle, in the county of King and State of Washington, have invented certain new and useful Improvements in Artificial Bait, of which the following is a specification.

My invention relates to improvements in artificial fishing-bait, and has special reference to a bait of this class which is especially adapted for alluring trout or like gamy fish.

The object of the invention is the production of an artificial bait having the appearance of a fish-egg, and thereby render it unnecessary to use the natural eggs in fishing.

The above-mentioned and other objects equally as desirable are attained by the construction set forth in the following specification, disclosed on the accompanying drawings, and succinctly pointed out in the appended claim.

With reference to the drawings filed herewith and bearing like reference characters for corresponding parts throughout, Figure 1 is a perspective view of a plurality of egg-shaped bodies, showing them as clustered together to represent a section of a fish-roe, and Fig. 2 is a view in perspective of a fishing-hook and shows a cluster of the bodies permanently attached thereto.

This invention comprehends either hollow or solid bodies, as 10, composed of any suitable material brought to the required form to give the same the appearance of natural fish-eggs. As now considered, each body is composed of suitable elastic material, as rubber or the like, as best serving to insure the return of body to normal shape after being compressed or distorted by the bite of a fish. These bodies are brought to the desired form in any convenient manner, as by casting the material of which they are formed in a mold of the required form and size to produce the bodies with an exterior surface resembling in shape that of the particular kind of fish-eggs it is desired to imitate, and the bodies 10 are, furthermore, conveniently given a color or tint corresponding to that of the natural fish-eggs imitated by applying thereto a coating of suitable paint or enamel of the desired shade or by forming the bodies from material previously colored.

This artificial bait may be permanently attached to a suitable fishing-hook, as 12, by forming it about the hook at the desired point; but I preferably form one of the bodies 10 with a small ear or projection, as 14, in which a suitable aperture, as 15, is provided to receive the hook or to receive a suitable tie, as a string or the like, by which the bait can be conveniently detachably connected to the hook.

As now considered, a plurality of these artificial fish-eggs are connected together in any suitable manner to form a bait resembling a cluster of fish-eggs severed from a roe, and when the bait is secured to the hook a number of these egg-shaped bodies are entirely free thereof.

Having thus described my invention, what I claim as new, and desire to secure by Letters Patent of the United States of America, is—

In combination with a fish-hook, an artificial bait comprising an egg-shaped body having the hook passed therethrough, and a plurality of egg-shaped bodies secured to the first-named body and being entirely free of the hook.

Signed at Seattle, Washington, this 10th day of March, 1903.

JOHN THOMAS MITCHELL.

Witnesses:
    ERNEST B. HERALD,
    ROBERT A. CULBERSON.